UNITED STATES PATENT OFFICE.

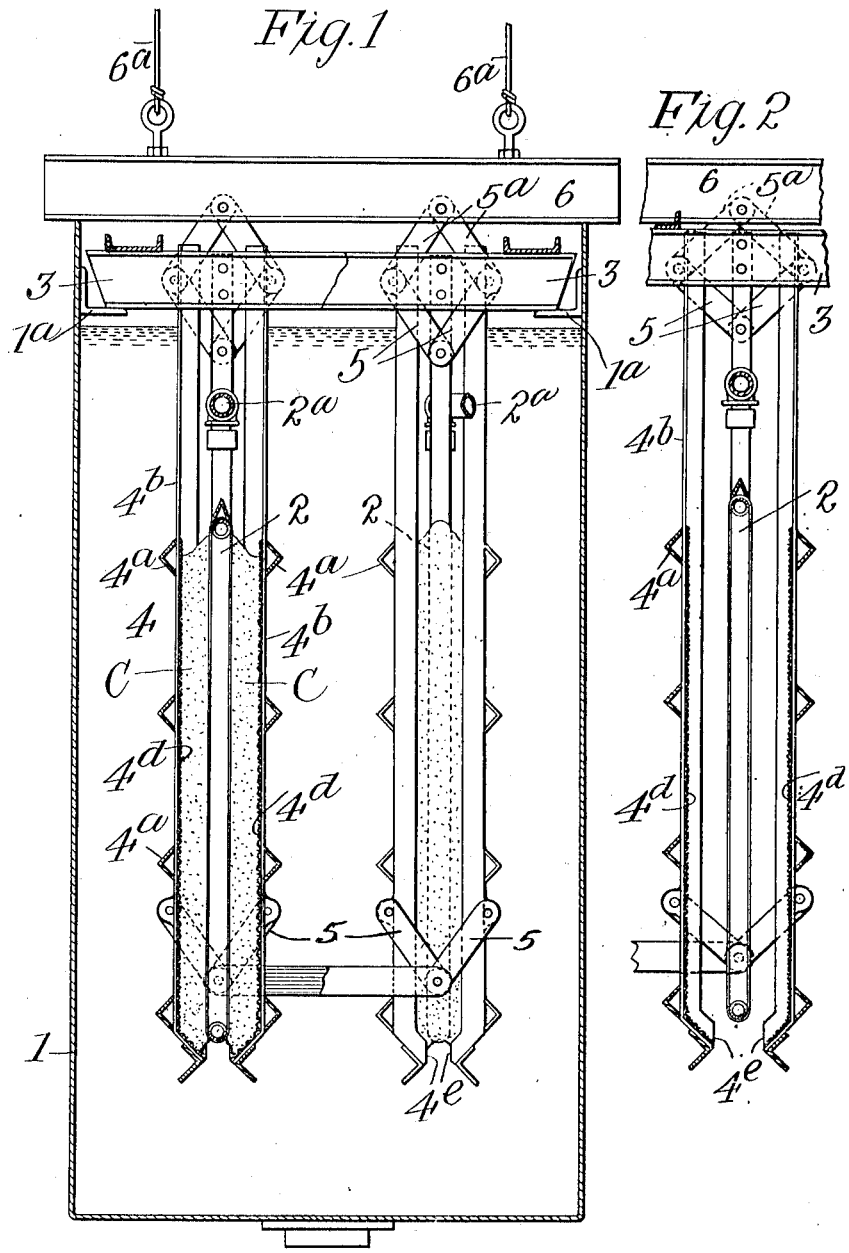

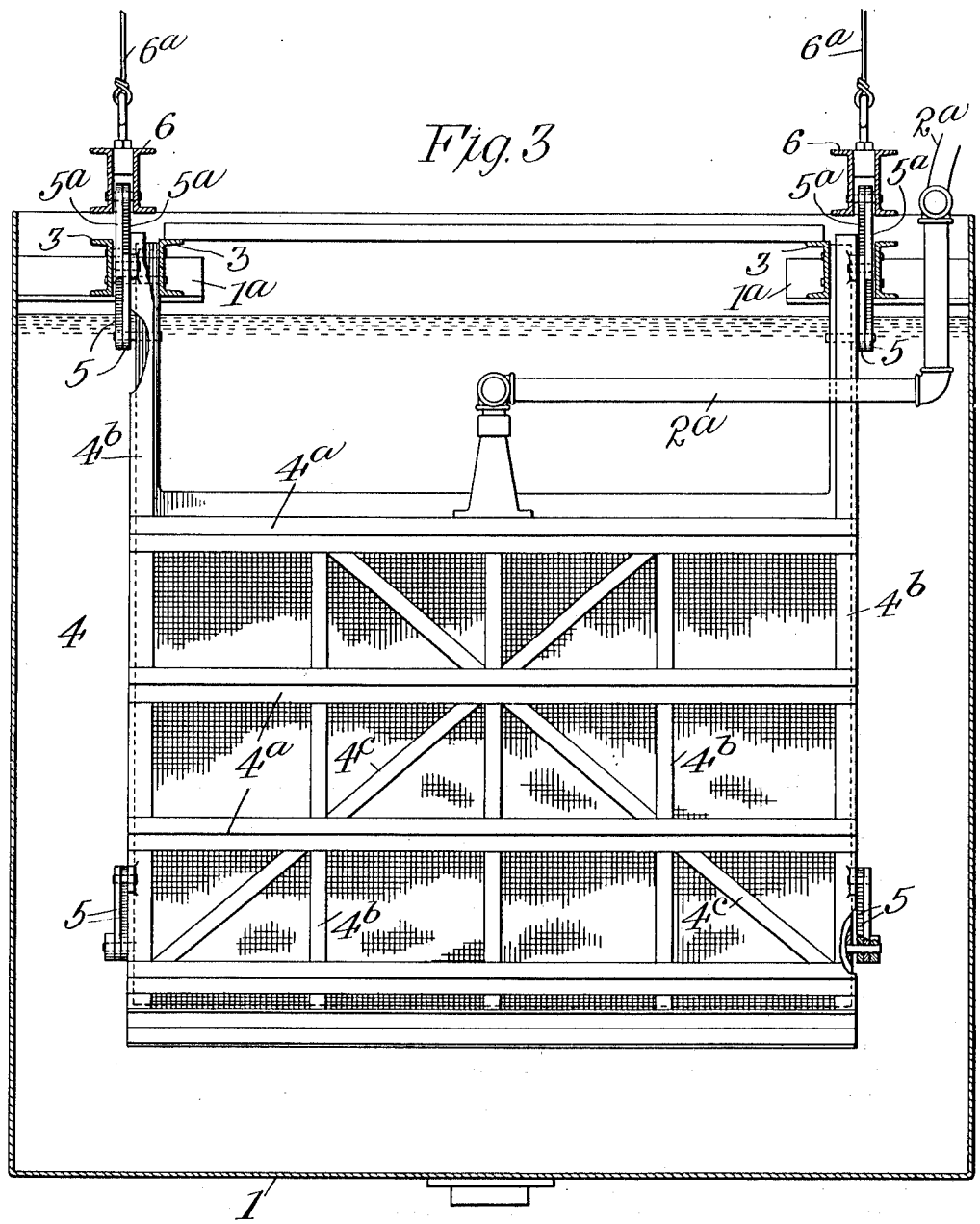

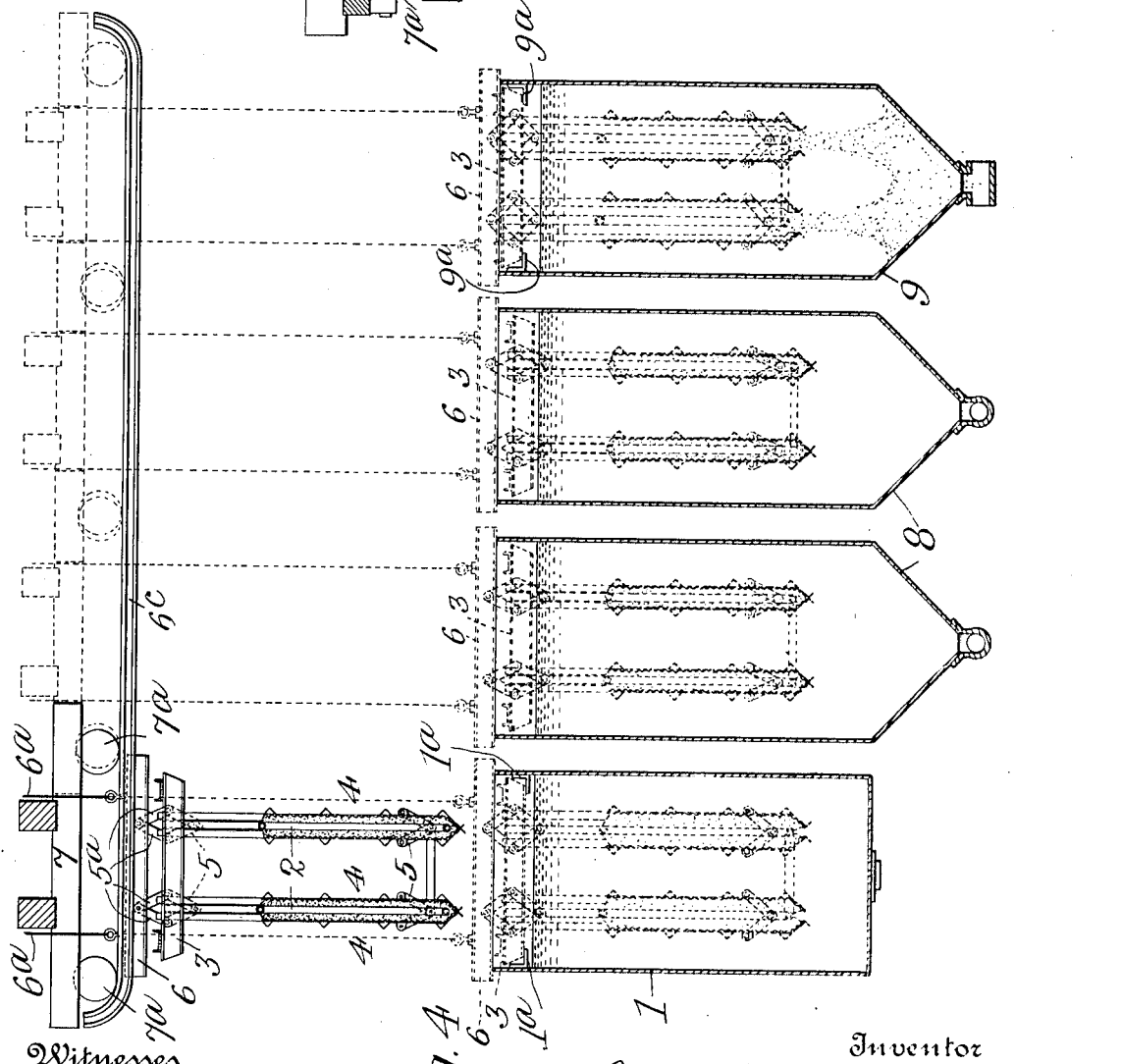

JAMES MILLAR NEIL, OF NEW YORK, N. Y.

FILTERING APPARATUS.

1,051,620.  Specification of Letters Patent.  Patented Jan. 28, 1913.

Application filed April 10, 1912.  Serial No. 689,790.

*To all whom it may concern:*

Be it known that I, JAMES MILLAR NEIL, of New York, in the county of New York and State of New York, have invented certain new and useful Improvements in Filtering Apparatus; and I hereby declare that the following is a full, clear, and exact description thereof, reference being had to the accompanying drawings, which form part of this specification.

This invention is a novel improvement in filtering apparatus and is particularly designed and adapted for use with suction or pressure filters which are submerged in the mixture to be filtered and then the clear liquor is withdrawn therethrough, thereby causing the solid matters in the mixture to collect on the outer surfaces of the filter; and when desired the coated filters may be separated from the mixture and the adhering solids removed therefrom; customarily the suction is continued while the coated filter is being separated from the mixture.

The object of the present invention is to enable such filters to be successfully employed in the separation of soft pulpy mucilaginous solids from liquids, which matters will ordinarily drop away from the filter surfaces as soon as the suction ceases, or if the filter is separated from the liquid; and my invention insures the retention of the coating or layers adhering to the filter when it is separated from the mixture; or while the coated filter is being moved from one tank to another, or from one point to another; and which will enable a filter coated with such soft materials to be transferred from a filtering tank to a washing tank or to a point of discharge without breaking up or losing the coating adhering thereto.

The invention is particularly advantageous for use in the treatment of wood pulp, sewage and the like, wherein the solid matters are so soft and pulpy that they will not adhere to the surfaces of the filter when the latter is separated from the liquid.

The invention consists in providing a filter (preferably a suction filter) with a movable retainer which when the filter is in operative position is separated from the filter surfaces and will not interfere with the action thereof, but before the filter is separated from the mixture such retainer can be moved toward the filter so as to more or less compress the coating of solids adhering to the filter surface and hold such coating against the filter surface while the filter is being separated from the mixture, or moved from one point to another.

In the preferred form of the apparatus the parts are so constructed that the retainer will be automatically moved away from the filter surface when the filter is placed in position in the mixture to be filtered; and will be automatically moved toward the filter so as to hold the coating against the filter surface when the filter is separated from the mixture.

In the accompanying drawings I have illustrated the invention as adapted to a double-faced filter of the well known Moore type, such filter being provided with a pair of automatically adjustable retainers, one opposite each filtering surface of the filter; but the invention is not restricted to any particular type of filter; nor to the arrangement shown in the drawings; and the invention obviously might be used with force filters, that is filters in which the liquid is passed through the filter by pressure instead of by suction.

In said drawings—Figure 1 is a sectional elevation of a tank or receptacle containing the mixture to be filtered; with a pair of suction filters therein each provided with my novel retainers; the filters being shown in operative position in the tank, and one filter and its retainers being shown in section. Fig. 2 is a detail view of a filter and retainers removed from the tank, the retainers being in discharging position. Fig. 3 is a side view of a filter and retainers, in a tank. Fig. 4 is a diagrammatic sectional elevation of a set of filtering, washing, and discharging tanks; and a set of filters with retainers; the filters and retainers being shown in different positions in dotted lines. Fig. 5 is a detail sectional elevation of the filter supports. Fig. 6 is a detail.

Referring to the drawings, 1 designates a tank or receptacle for the liquor or mixture to be filtered. This tank may be of any suitable construction and is preferably open at top. Within the tank is shown a pair of hollow suction filters 2, preferably such as are shown in Moore's Patent No. 764,486 dated July 5, 1904. Each filter 2 is connected by pipes $2^a$ to a suitable suction apparatus, not shown, by which clear liquor can be withdrawn from the tank 1 through the filters 2 and conducted to any suitable point of discharge. The filters 2 may be suspended from movable bars 3.

At the sides of each filter are located adjustable retainers 4, which substantially correspond in area and size to the opposed filtering surfaces of the filter. Said retainers may be composed of a series of horizontal bars $4^a$ connected to vertical bars $4^b$ and braced by diagonal strips $4^c$; and to the inner sides of such bars I preferably attach a sheet of perforated or reticulated metal $4^d$. Each retainer 4 preferably extends somewhat below the lower end of the filter and its lower edge is preferably bent inward as indicated at $4^e$, for a purpose hereinafter explained.

The retainers are preferably movably connected to the filter by means of links 5, pivoted at their outer upper ends to the ends of the retainer frames, and at their inner lower ends to the ends of the filter frame; so that if the retainers be permitted to drop relative to the filter they will move away from the surface of the filter, and if they be raised relative to the filter they will move toward the filter. The side bars $4^b$ of each retainer frame are also connected at their upper ends by links $5^a$ to a suspension bar 6. The links $5^a$ incline oppositely to the links 5 and form a toggle joint therewith. The suspension bar 6 is connected by a chain or rope $6^a$ to suitable take-up apparatus (not shown) on a carrier 7, which is provided with wheels $7^a$ by which it is supported upon a track $6^c$ above the tank 1.

The track $6^c$ usually extends from above tank 1 to and over a series of adjacent tanks 8 and 9, as indicated in Fig. 4. The tanks 8 are washing tanks; and the tank 9 is a discharging tank, into which the collected and washed solids may be discharged. By means of this carriage 7 the filters, when raised, can be transported from one tank to another. This arrangement of tanks, supporting frame, track, and carrier, is commonly used, for example, in cyaniding plants and is only diagrammatically illustrated in the drawings, and as the details of construction thereof form no part of the present invention they need not be further explained; it should be understood, however, that suitable means are provided whereby when desired the filters and attached retainers may be raised from one tank, by winding up ropes $6^a$, and then transported to any suitable point; or to and over any one of the other tanks and then can be again lowered into such tank.

In the practical utilization of my invention, as applied to such an apparatus, the parts are so arranged that when the filters 2 are lowered into the tank 1, the bar 3 contacts with and rests upon strips $1^a$, and thereby suspends the filters in the tank 1, as indicated in Figs. 1 and 4; the filters being thus suspended in tank 1 before the suspension bar 6 comes to rest upon the top of the tank; consequently after the filters have stopped, the retainers continue to lower until bar 6 rests upon the top of the tank, or other suitable support, (Figs. 1 and 4); and as the retainers lower links 5 cause them to move outwardly or away from the filter, and during the filtering operation the retainers stand away from the filter surfaces as indicated in Fig. 1. Suction is then applied to the filter through pipe $2^a$, and clear liquor is withdrawn through the filter; and during such withdrawal of the clear liquor the suspended matters in the mixture in the tank are drawn toward and against the surfaces of the filter and eventually form a thick coating thereupon, such coating lying between said surfaces and the retainers, as indicated at C in the drawings.

When it is desired to remove such coated filter from tank 1 the bar 6 is raised, and as it rises first lifts the retainers which, by reason of the link connections, move inward or toward the opposed surfaces of the filter; and then bar 3 and the filter are lifted, with the bar 6, until the filter is withdrawn from the tank as indicated in full lines in Fig. 4. When the retainers move toward the filter the bottom portions $4^e$ pass under the lower edges of the layers of material C on the filter surfaces and prevent the latter dropping vertically from between the filter and retainers (see Fig. 4). Then the suspended filter can be moved along the track to any desired point; for instance to and over tank 8, and when in position thereover can be lowered into the tank 8 as shown in dotted lines Fig. 4; the tank 8 being a washing tank it is not desired to release the material C therein, and therefore the bar 3 with the filters and retainers remain suspended from the bar 6 while the filters are submerged in the liquid in the tank 8, as indicated in Fig. 4; and while so submerged clear water can be drawn through the layers of material C on the filters, washing such material and removing therefrom any impurities or values which may have been carried over therewith from the tank 1. If desired a plurality of washing tanks 8 may be used, and the filters successively removed from one tank 8 into another for repeated washings as indicated in Fig. 4.

After the layers C have been washed as much as desired, the filters and retainers may be moved in the manner described into the tank 9. This tank is provided with brackets or rests $9^a$ which when the filters are lowered thereinto will engage and support the bar 3 and suspend the latter and the filters, while the bar 6 and the retainers continue to descend, and as the retainers descend they move away from the surfaces of the filters and from the layers of material C (Figs. 2 and 4) which can then be discharged into the tank 9. The discharge may be rapidly effected, if desired, by reversing the current in pipes 2ª and blowing air or liquid back through the filters. The washing tank 8 would be used only where the material C contains some values which have been carried thereover from the tank 1; or is of such nature that it is desired to wash it before finally discharging same.

The inward movement of the retainers toward the filter may be arrested either by the compression of the layers C; or, if desired, by suitably arranged stops. For example a stop bolt 5ⁿ may be attached to one link 5ª, and engage the other link, as indicated in Fig. 6; or any other suitable mechanical device may be used to limit the movement of the retainers toward the filter and thus regulate the compression of the material on the filter surfaces.

As stated the invention is particularly useful where very soft materials are to be treated; for example in the treatment of sewage, wherein the matters drawn against the filters are very soft and non-adhesive or coherent, but by means of the retainers the layers of such material can be securely held against the surfaces of the filter while the latter is being separated from the tank or mixture. By means of this apparatus solids can be quickly and rapidly separated from liquids, and can be removed in mass from the liquid no matter what the nature of the solids may be.

The essential novel feature of the present invention is providing a filtering surface with a retainer by which the coating on the filter may be held in place, such retainer being movable to and from the filter surface so that during the filtering operation it will not interfere with the filtering, and after the filtering operation it may be moved toward the filter and hold the coating of material thereagainst with any desired pressure while the same is being separated from the liquid.

What I claim is:

1. In filtering apparatus, the combination of a suction filter, a retainer beside the filter and parallel therewith, and means for moving the retainer broadside directly to and from the filter surface.

2. In combination, a filter, a retainer opposite the filter surface, and means whereby the retainer is separated from the filter when the same is moved to operative position and is moved toward the filter when the latter is removed from filtering position.

3. In combination with a filter, a retainer opposite the filter surface, and means whereby the retainer is automatically separated from the filter when the same is lowered to operative position and is automatically moved toward the filter when the filter is raised from filtering position.

4. In combination with a filter, a retainer opposite the filter surface, and links connecting the retainer and filter whereby the retainer is caused to move to or away from the filter surface when the filter is raised or lowered.

5. In combination with a suction filter, a retainer opposite the filter surface, links connecting the retainer and filter frame whereby the retainer is caused to move to or away from the filter surface as the filter is lowered or raised, and means for limiting the movement of the retainer toward the filter.

6. In a filtering apparatus, the combination of a filter, a retainer beside the filter, automatic devices for moving the retainer to or from the filter surface when the filter is raised or lowered; and means for limiting the movement of the retainer toward the filter.

7. In combination, a filter, a retainer opposite the filter surface; means whereby the filter is automatically separated from the filter when the same is lowered to operative position and is automatically moved toward the filter when the filter is raised or removed from filtering position; and means for limiting the approach of the retainer to the filter.

8. In combination, a filter; means for suspending the filter; a retainer; means for suspending the retainer; and connections between the filter suspending means and the retainer suspending means, whereby the retainer is moved away from the filter when the filter is moved to filtering position and the retainer is moved toward the filter when the filter is removed from filtering position.

9. In combination, a filter having opposed filtering surfaces, movable retainers opposite the filter surfaces, devices connecting the retainers to the filter frame, a supporting bar, toggle links connecting the retainers and filter with said bar whereby the retainers are allowed to move away from the filter when the latter is lowered to working position and caused to move toward the filter as the latter is raised from operative position.

10. In combination, a filter having opposed filtering surfaces; movable retainers opposite the filter surfaces; links connecting the retainers to the filter; a supporting bar; toggle links connecting the retainer with said bar, whereby the retainers are allowed to move away from the filter when the latter is lowered to working position and caused to move toward the filter as the latter is raised from operative position; and means for limiting the movement of the retainers toward the filter.

11. In combination with a tank, a filter, a bar adapted to support said filter in the tank, retainers at opposite sides of the filter; links connecting the filter and retainers with said suspension bar, whereby when the suspension bar is raised the retainers are first moved toward the filter and then the filter lifted; and when the parts are lowered and the filter frame stopped the retainers can move down and away from the surfaces of the filter.

12. In combination with a tank, a filter, a bar adapted to support said filter in the tank; retainers at opposite sides of the filter; links connecting the retainers to the filter; links connecting the retainers to the suspension bar; links connecting the filter to said suspension bar; and means for limiting the movement of the retainers toward the filter.

In testimony that I claim the foregoing as my own, I affix my signature in presence of two witnesses.

JAMES MILLAR NEIL.

Witnesses:
　GRACE F. NIEMANN,
　CECIL GUMBS.